(12) United States Patent
Chatting et al.

(10) Patent No.: US 7,620,264 B2
(45) Date of Patent: *Nov. 17, 2009

(54) IMAGE-SIZE DEPENDENT FACIAL CARICATURING

(75) Inventors: David J Chatting, Ipswich (GB); Jeremy M Thorne, Ipswich (GB); Charles Nightingale, Ipswich (GB)

(73) Assignee: British Telecommunications public limited company, London (GB)

( * ) Notice: Subject to any disclaimer, the term of this patent is extended or adjusted under 35 U.S.C. 154(b) by 154 days.

This patent is subject to a terminal disclaimer.

(21) Appl. No.: 10/556,455

(22) PCT Filed: Apr. 23, 2004

(86) PCT No.: PCT/GB2004/001784

§ 371 (c)(1), (2), (4) Date: Nov. 10, 2005

(87) PCT Pub. No.: WO2004/102484

PCT Pub. Date: Nov. 25, 2004

(65) Prior Publication Data

US 2007/0003160 A1 Jan. 4, 2007

(30) Foreign Application Priority Data

May 15, 2003 (GB) ................... 0311185.3

(51) Int. Cl.
*G06K 9/36* (2006.01)

(52) U.S. Cl. ............... 382/276; 382/100; 382/203; 382/325; 345/646; 345/660

(58) Field of Classification Search .............. 382/100, 382/203, 289, 276, 293
See application file for complete search history.

(56) References Cited

U.S. PATENT DOCUMENTS 5,960,099 A * 9/1999 Hayes et al. ............... 382/118

(Continued)

FOREIGN PATENT DOCUMENTS

FR 0990979 A1 * 5/2000

(Continued)

OTHER PUBLICATIONS

Takayuki Fujiwara, Takeshi Nishihara, Masafumi Tominaga, Kunihito Kato, Kazuhito Murakami, and Hiroyasu Koshimizu, "On the Detection of Feature Points of 3D Facial Image and Its Application to 3D Facial CAricature", 3-D Digital Imaging and Modeling, 1999, Proceedings, Second International Conference on Ottowa Ont., Canada Oct. 4-8, 1999, pages.*

(Continued)

*Primary Examiner*—Matthew C Bella
*Assistant Examiner*—Eric Rush
(74) *Attorney, Agent, or Firm*—Nixon & Vanderhye PC

(57) ABSTRACT

Increased recognizance of caricatured images is provided for the level of caricaturing to be applied to an image to be set in dependence on the intended size of the caricature image. Preferably, the caricature level is set as a generally inverse function of the image size, such that the smaller the image the greater the level of the caricaturing that is applied. In such a case increased recognizance of subjects represented in smaller images may result.

5 Claims, 5 Drawing Sheets

U.S. PATENT DOCUMENTS

| | | | | |
|---|---|---|---|---|
| 6,385,628 | B1* | 5/2002 | Massarsky | 715/502 |
| 2002/0015512 | A1 | 2/2002 | Buddenmeier et al. | |
| 2002/0018595 | A1 | 2/2002 | Kwak | |
| 2003/0206171 | A1* | 11/2003 | Kim et al. | 345/473 |
| 2005/0100243 | A1* | 5/2005 | Shum et al. | 382/276 |
| 2006/0257013 | A1* | 11/2006 | Ramm et al. | 382/133 |
| 2007/0019885 | A1* | 1/2007 | Chatting et al. | 382/289 |

FOREIGN PATENT DOCUMENTS

| | | |
|---|---|---|
| GB | 2372168 A | 8/2002 |
| WO | WO 01/59709 A1 | 8/2001 |

OTHER PUBLICATIONS

PCT International Search Report—Aug. 5, 2004.

Murakam et al., "Dynamic Facial Caricaturing System based on the Gaze Direction of Gallery", Automatic Face and Gesture Recognition, 2000, Proceedings, Fourth IEEE International Conference on Grenoble, France Mar. 28-20, 2000, Los Alamitos, CA, USA, IEEE Comput. Soc., US, Mar. 28, 2000, pp. 136-141.

Fujiwara et al., "On the Detection of Feature Points of 3D Facial Image and its Application to 3D Facial Caricature", 3-D Digital Imaging and Modeling, 1999, Proceedings, Second International Conference on Ottawa, Ont., Canada Oct. 4-8, 1999, Los Alamitos, CA, IEEE Comput. Soc. US, Oct. 4, 1999, pp. 490-496.

GB Search Report dated Oct. 7, 2003 (from USSN 10/556,459).

Official Action dated Oct. 7, 2003 in USSN 10/556,459.

* cited by examiner

IMAGE-SIZE DEPENDENT FACIAL CARICATURING

This application is the US national phase of international application PCT/GB2004/001784 filed 23 Apr. 2004 which designated the U.S. and claims benefit of GB 0311185.3, dated 15 May 2003, the entire content of which is hereby incorporated by reference.

RELATED APPLICATION

This application is related to U.S. Ser. No. 10/556,459 filed Nov. 10, 2005 naming as inventors: David John Chatting, Jeremy Michael Thorne and Mark Simon Fendley.

BACKGROUND

1. Technical Field

The invention relates to a method and system for generating caricature images, wherein the level of caricature is dependent on the intended size of the resulting image.

2. Related Art

Automatic caricaturing methods and systems are already known in the art. Brennan, S. E. in "Caricature Generator: The Dynamic Exaggeration of Faces by Computer." Leonardo, Vol. 18 no. 3, pp. 170-178 describes a computational model of caricature which allowed a two dimensional line drawn caricature to be generated from photographs. The user traces over the original image (by placing a set of markers over the image) to generate a veridical line drawing of the subject. An example of such an original image and the resulting veridical line drawing are shown in FIGS. 1a-1b. Here, an original image as shown in FIG. 1(a) results in a veridical line drawing as shown in FIG. 1(b)

Having obtained the veridical line drawing of the subject, this drawing is then compared with a corresponding line drawing of a "mean" or "prototype" face, by which is meant an average face of a group usually comprising the same race, gender, and colour as the subject. Thus, for the white Caucasian male shown in FIG. 1(a), usually a prototype face of an "average" white Caucasian male would be used. In some circumstances prototype faces from different ethnic groups may be used.

Rowland et al in Imagina 97—Conferences—ACTES/Proceedings, February, Monte Carlo, (1997), pp 159-175 describe how a prototype face may be derived as follows. A prototype can be defined as being a representation of the consistencies across a collection of faces. For example, a prototypical male Caucasian face would contain all that is consistent about Caucasian faces and can be generated by calculating a mean face from a set of Caucasian faces.

To derive the prototypical shape for a group of faces, the delineation data for each face are first "normalised", making the faces nominally of the same size and orientation. The left and right pupil centres provide convenient landmark points for this process. The first step is to calculate the average left and right eye positions for the whole population. The next step is to apply a uniform translation, scaling, and rotation to the (x, y) positions of all the feature points, thus normalising each face to map the left eye to the average left eye position and the right eye to the average right eye position. This process maintains all the spatial relationships between the features within each face but standardises face size and alignment. It is then possible to calculate the average positions of each remaining template point (after alignment), the resulting data constituting the mean shape for the given population. A line drawing of the resulting "mean" or prototype face can then be obtained. An example line drawing of a mean face is shown in FIG. 2.

Once a prototype has been formed for a collection of faces it is possible to generate caricatures by accentuating the difference between an individual face and a relevant prototype. After normalising the feature location data from the prototype to the eye positions of an example face, all feature points on the example face can be shifted away from their counterparts on the prototypical face by a given percentage. This percentage is the amount of caricature and can be thought of as extrapolating a morph between a prototype and the example face. If the percentage is 100% then the product of the manipulation will be the prototype, if the percentage is 50% then the result will be halfway along the morph between the prototype and the example face, if the percentage is 0% then the example face is returned, if it is −50% then a caricature of the original face is the result. More generally, any percentage less than 0% will result in a caricatured face.

It has also been shown in Rhodes, G. & Brennan, S. E. (1987). Identification and Rating of Caricatures: Implications for Mental Representations of Faces. Cognitive Psychology, 19, 473-497 that caricaturing of faces results in greater recognition of the caricature face as the subject than an uncaricatured face.

BRIEF SUMMARY

The present exemplary embodiments apply the above findings of the prior art with regards to increased recognizance of caricatured images by providing a method and system which provide for the level of caricaturing to be applied to an image to be set in dependence on the intended size of the caricature image. Preferably, the caricature level is set as a generally inverse function of the image size, such that the smaller the image the greater the level of the caricaturing that is applied. In such a case the inventors believe that increased recognizance of subjects represented in smaller images may result.

In view of the above, from a first aspect the invention provides a method of generating a caricatured image, comprising the steps of:

determining a caricature level value in dependence on an intended size of the caricatured image to be generated; and generating the caricatured image using the caricature level value thus determined.

The invention provides the advantage that enhanced recognition of subjects shown in images can be obtained through caricaturing, wherein the enhanced recognition is dependent on the intended size of the image.

Preferably, the determining step further comprises determining the caricature level value as a generally inverse function of the intended size of the caricatured image to be generated. This provides the advantage that recognition of smaller images may be enhanced to a greater degree through increased caricaturing than larger images.

From a second aspect there is further provided a system for generating caricatured images, the system comprising processing means arranged in use to:

i) determine a caricature level value in dependence on an intended size of the caricatured image to be generated; and ii) generate the caricatured image using the caricature level value thus determined.

The invention in the second aspect provides the same advantages and further features as previously described in respect of the first aspect.

From a third aspect the present invention further provides a computer program or suite of computer programs arranged such that when executed by a computer system it/they cause the computer system to operate according to the aforementioned first aspect.

Moreover, from a fourth aspect, there is also provided a computer readable storage medium arranged to store a computer program according to the third aspect of the invention. The computer readable storage medium may be any magnetic, optical, magneto-optical, solid-state, or other storage medium capable of being read by a computer.

BRIEF DESCRIPTION OF THE DRAWINGS

Further features and advantages will become apparent from the following description of embodiments of the present invention, presented by way of example only, and by reference to the accompanying drawings, wherein like reference numerals refer to like parts, and wherein.

DETAILED DESCRIPTION OF EXEMPLARY EMBODIMENTS

Embodiments of the invention will now be described with respect to FIGS. 3 to 6.

Figure 3:
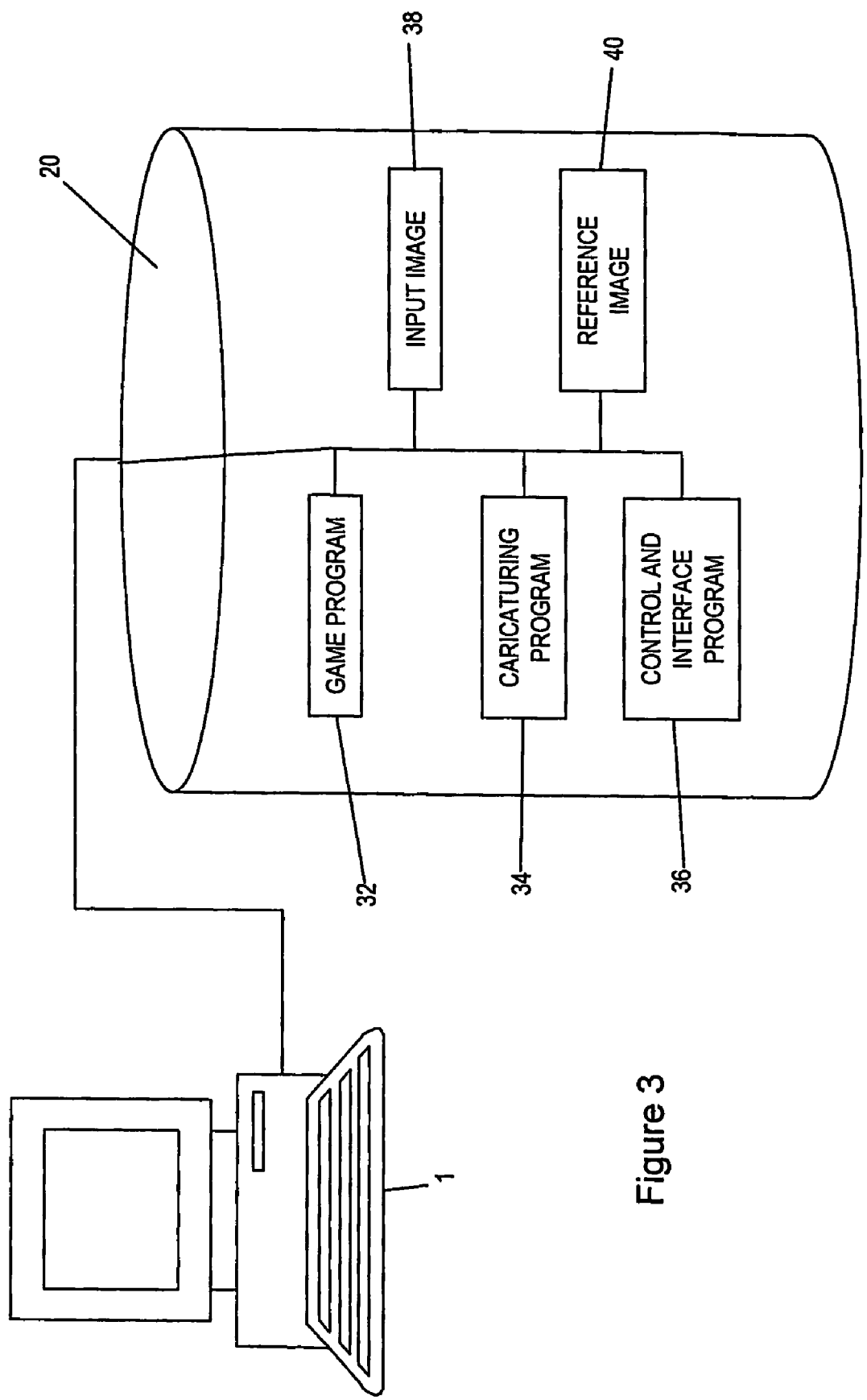
FIG. 3 is a block diagram showing the main elements of an embodiment of the invention.

FIG. 3 illustrates the hardware which provides an operating environment for the embodiment of the present invention. Particularly, the operating environment comprises a general purpose computer 1, which may be a standard desktop, laptop, or the like. Moreover, although we have shown the general purpose computer 1 to be a desktop computer, it should also be understood that almost any device capable of performing processing operations on data may be used, and in particular mobile devices such as mobile telephones, personal digital assistants, or the like. Within the embodiment to be described, however, let us assume that the processing device is a general purpose computer such as is commonly known in the art.

The general purpose computer 1 is provided with a storage device 20 in the form of a hard disk drive, floppy disk drive, memory, optical storage, or the like, as is also commonly known in the art. Stored on the storage device 20 are various programs and data 32 to 40. More particularly, the embodiment of the invention provides a caricaturing program 34, which acts to generate caricatured images given an input image, as well as a control and interface program 36, which when executed acts to control the caricaturing program, and to provide an interface thereto. Additionally stored on the storage device 20 is data corresponding to an input image 38, as well as data corresponding to a reference image 40. Both the input image data 38 and the reference image data 40 are required by this embodiment of the invention. The storage device 20 also stores another computer program, which, in this example, is a game program 32. The game program 32 will be used to describe a second embodiment of the invention later.

Having described the operating environment required by the embodiments of the invention, and the programs and data provided by the embodiments, the operation of a first embodiment will now be described with respect to FIG. 4. In the first embodiment of the invention to be described, the intended caricature image size is determined by a user using the control and interface program 36. That is, assume here that a user wishes to produce a caricatured image which may then be saved and/or displayed on the screen.

In order to achieve this object, the user first accesses the control and interface program 36, for example by double clicking on a suitable icon on the general purpose computer 1 desktop. This action acts to launch the control and interface program 36, which provides a graphical user interface for the embodiment of the invention, and provides user control buttons and the like in order to allow the user to start the caricaturing process, stop the caricaturing process, and to input images to be used as the basis for a caricatured image to be generated. Additionally, in the first embodiment the control and interface program 36 provides further user controls to allow the user to set the size of the caricature image to be generated.

Figure 1:
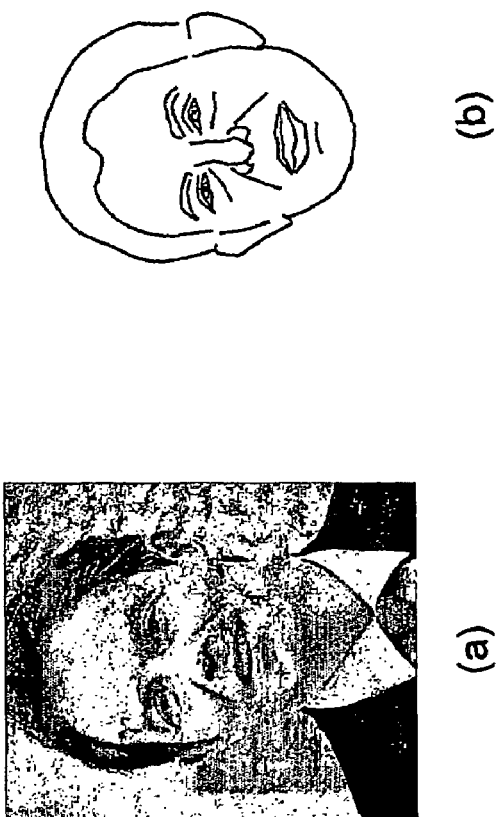
FIG. 1(a) is an example input image to an embodiment of the invention.
FIG. 1(b) is a veridical line drawing corresponding to the image of FIG. 1(a)
Figure 4:
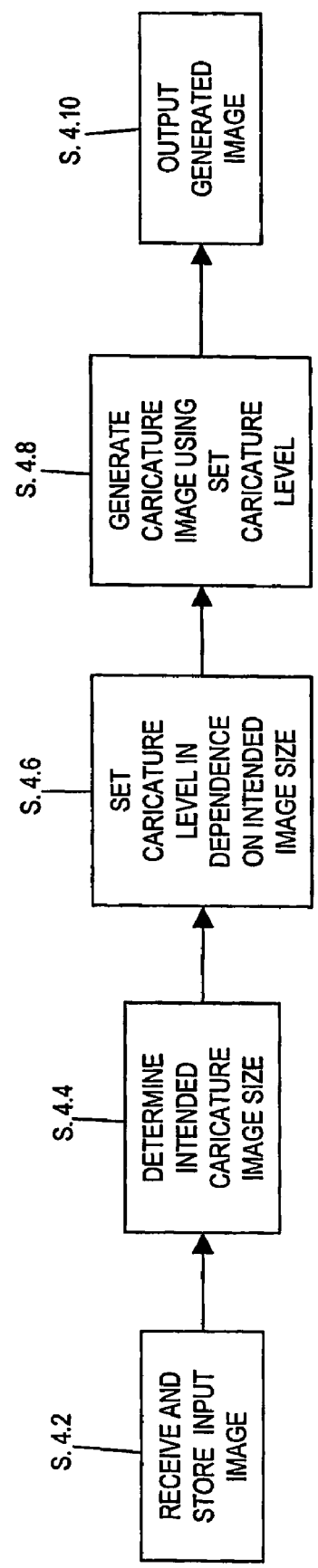
FIG. 4 is a flow diagram setting out the processing steps performed in an embodiment of the invention.

In view of the above, and referring to FIG. 4, at step 4.2 a user starts the control and interface program 36, and uses the control and interface program 36 in order to specify an input image. The input image may be, for example, captured by a digital camera, or may be an already existing input image which the user has downloaded or the like. The input image may be a photograph such as shown in FIG. 1(a), or alternatively may be a veridical line drawing such as is shown in FIG. 1(b). Whatever the format of the input image, the control and interface program 36 acts to store the input image as input image data 38 in the storage device 20. Additionally, where the input image is a photograph, and where required for the particular caricaturing algorithm being used, the control and interface program 36 acts to guide the user to generate a veridical line drawing of the subject in the photograph, which may then be used as the basis for caricaturing later on. In such a case the generated veridical line drawing image is also stored as input image data 38 in the storage device 20.

Having received the input image and stored it in the storage device 20, the next step in the process at step 4.4 is that the control and interface program 36 prompts the user to select an intended image size for the caricatured image to be generated. As mentioned previously, the control and interface program 36 provides user controls as part of the graphical user interface in order to allow for the user to set or select the intended caricature image size. Therefore, at step 4.4 the user sets the intended caricature image size using these controls.

Having received the intended caricature image size from the user, at step 4.6 the control and interface program 36 acts to set the caricature level in dependence on the intended image size. It should be understood that the caricature level may be set as any function of the intended image size, but in the embodiment described here the caricature level is set as a generally inverse function of the intended image size, but preferably only over a sub-range of the possible intended image sizes. An example function which may be used to set the caricature level is shown in FIG. 5.

Figure 5:
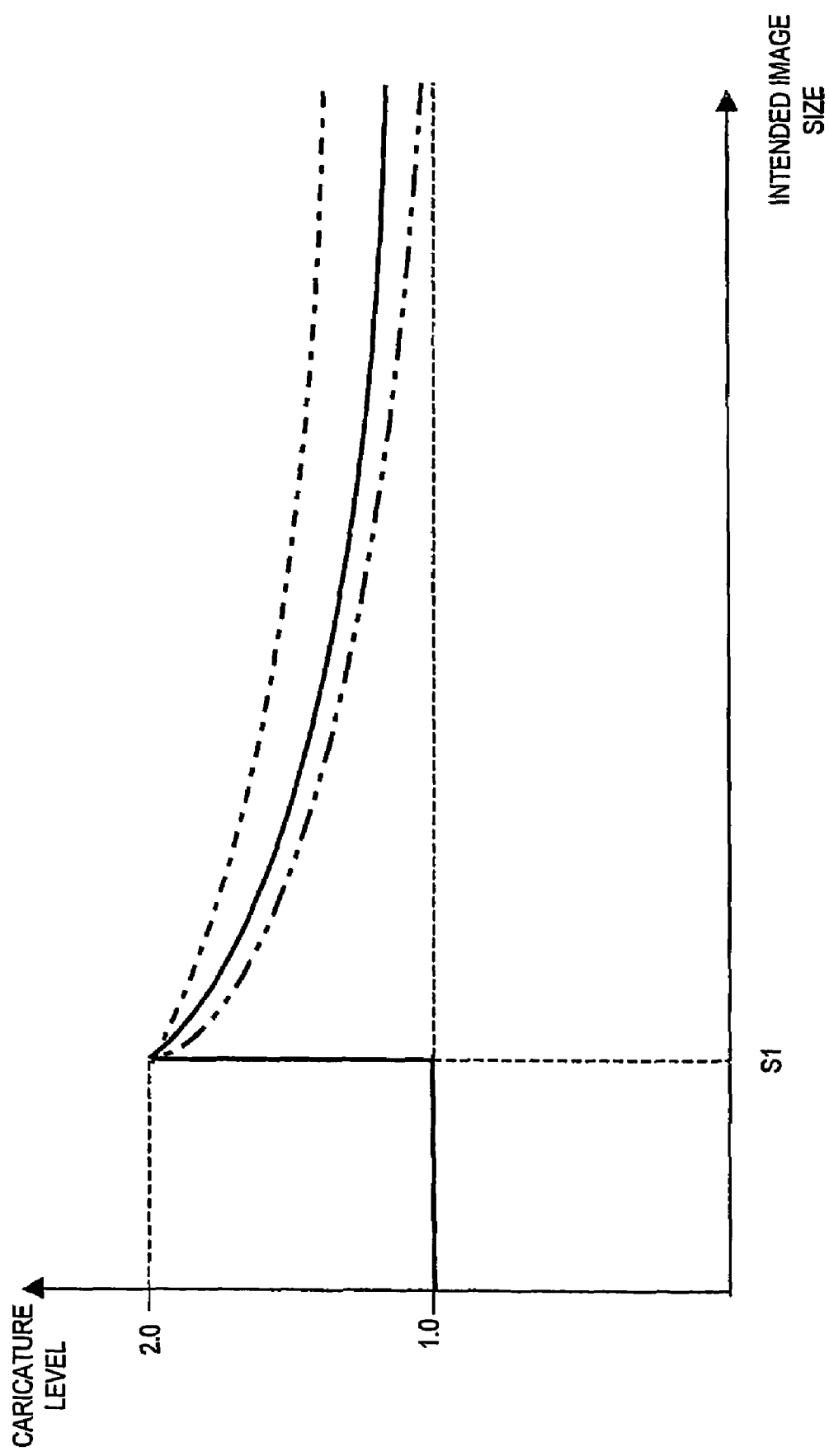
FIG. 5 is a plot of an example function varying the caricature level in dependence on the image size used in an embodiment of the present invention.

FIG. 5 illustrates a plot of the caricature level against the intended image size provided by the present embodiment. Here it will be seen that the caricature level varies generally inversely with the intended image size above a threshold image size S1. The precise function which defines the variation is shown here as a curve, but the parameters of the curve may be varied to give shallower or steeper curves, as shown. Preferably, the curve tends to a caricature level of 1.0, as the image size increases.

Additionally, the maximum caricature level is shown here as 2.0, but the invention is not limited to this, and any caricature level may be chosen as the maximum caricature level. The inventors have found, however, that caricature levels above 2.0 result in lower quality results.

Figure 2:
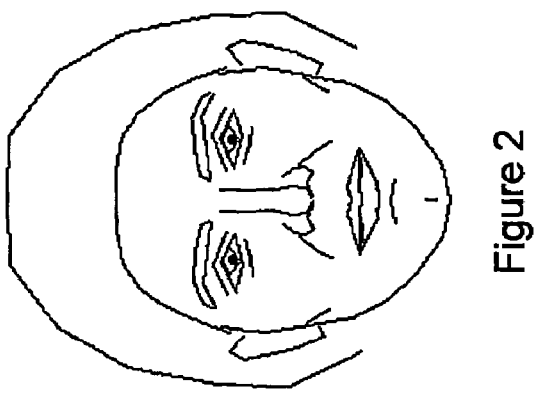
FIG. 2 is a line drawing of a mean or "prototype" face used in the embodiments of the invention.

From FIG. 5 it will be seen that for image sizes less than the threshold image size S1, the caricature level is set to 1.0. A caricature level of 1.0 means that the output caricature image will be identical to the input image upon which the caricature image is to be based i.e. no caricaturing will be applied. Moreover, note here that a caricaturing level of 0 means that the output caricature image will be the same as the mean or prototype face as shown in FIG. 2.

The reason for not applying caricaturing to images smaller than the threshold image size S1 is that for such small images the facial features contained within the image would tend to be so small that they would be indiscernible in any event. Therefore, for reasons of computational efficiency, the caricaturing algorithm is not applied to images smaller than the threshold image size S1, and instead the input image is output instead. In such a case the processing then ends. Example threshold levels for S1 could be an image size of less than 20×20 pixels i.e. S1=400 square pixels. Other threshold sizes may of course be chosen.

The caricature level setting function as shown in FIG. 5 may be implemented by storing an appropriate mathematical function which defines the function, or alternatively by storing the function in the form of a lookup table of caricature level values against intended image sizes.

Returning to FIG. 4, having set the caricature level and assuming the image size is greater than the threshold size S1 such that the caricature level is greater than 1, then at step 4.6 the control and interface program 36 causes the general purpose computer 1 to run the caricaturing program 34, and the caricature level which was set at step 4.6 is passed to the caricaturing program 34 as input. Additionally, the control and interface program 36 also passes the input image data 38, as well as information relating to the intended size of the caricature image to be generated to the caricaturing program 34, as additional inputs. Next, at step 4.8 the caricaturing program 34 acts to generate a caricature image based on these inputs passed thereto. It should be noted here that the algorithm used to generate the caricatured image by the caricaturing program 34 may be any caricaturing algorithm which allows a caricaturing level to be set. As a non-limiting example any such algorithm already known in the art may be used, but in particular the Brennan algorithm referenced previously is particularly envisaged, and those features thereof necessary for fully understanding the present invention are hereby incorporated herein by reference.

Once the caricature image has been generated, at step 4.10 the caricaturing program outputs the generated image, and in the first embodiment the control and interface program 36 displays the generated image to the user using the graphical user interface provided thereby.

Therefore, in the first embodiment the user is asked to set the intended image size, from which the caricature level is then set according to a generally inverse function such as is shown in FIG. 5, and a caricatured image then produced using the set caricature level, by a known caricaturing algorithm. The generated caricature image can then be displayed to the user.

Figure 6:
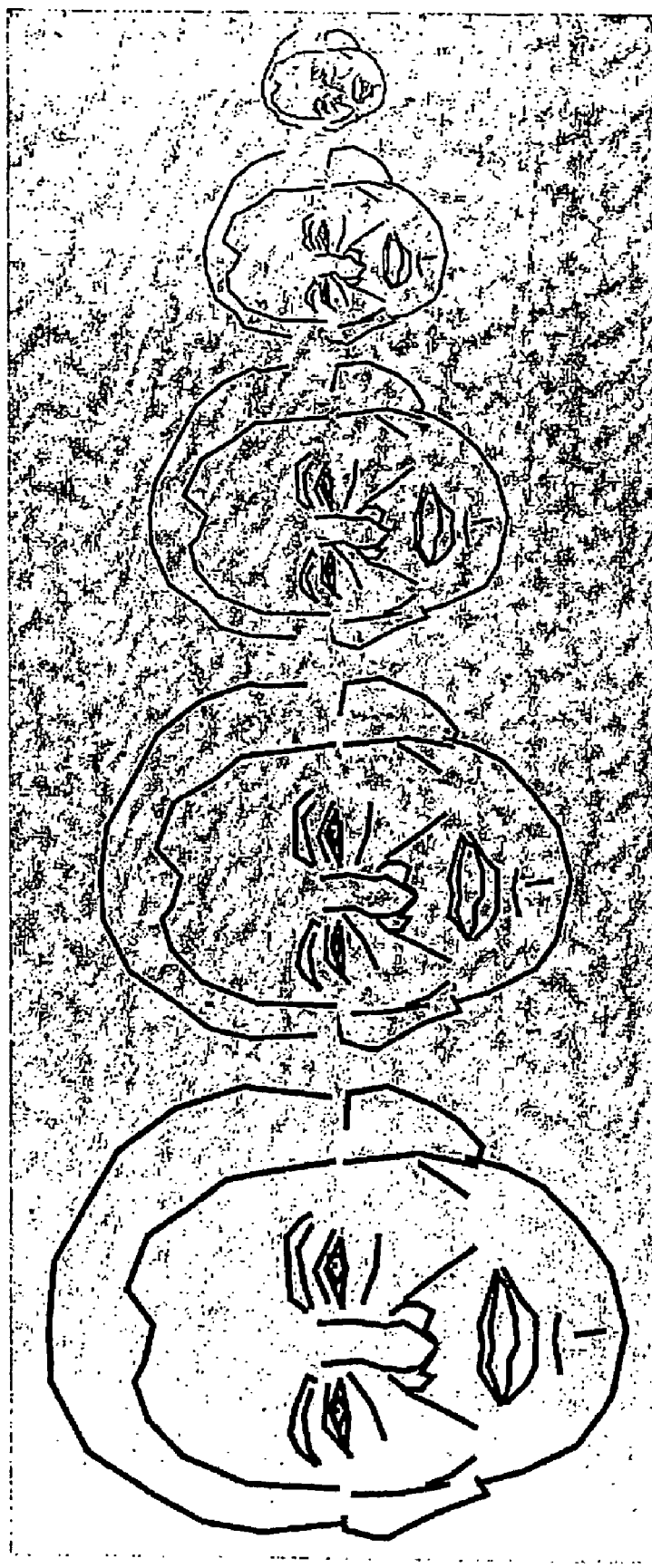
FIG. 6 are line drawings illustrating output images of various sizes from an embodiment of the invention.

FIG. 6 illustrates the effect of the intended caricature image size on the output of the present invention. Particularly, FIG. 6 illustrates five output caricature images, wherein the caricature level has been increased in an inverse relationship to the caricature size. This will be apparent by considering the smallest caricature image on the right hand side, and comparing the features thereof to the largest caricature image on the left hand side, and which has the least caricature level applied thereto. It will be seen that the smallest caricature image which has had the greatest caricature level applied has more distorted features than that of the largest caricature image but that the smallest caricature image is still recognisable as being an image of the same person as that shown in the largest caricature image.

A second embodiment of the invention will now also be described. The second embodiment is identical to that of the first embodiment save for the manner in which the intended caricature image size is determined by the control and interface program 36.

Within the second embodiment, the caricatured images generated by the embodiment of the invention are not merely displayed to a user, but instead are used by a third party program such as, for example, the game program 32. That is, imagine that the game program 32 is a program wherein facial images of different sizes must be displayed to the user. For example, the game program may be a virtual reality adventure game such as is known in the art under the names of Quake™ or Doom™, or alternatively may be, for example, a sports simulation program such as a football game, wherein the characters are known football players. The game program 32 is executed by the general purpose computer 1 under the control of the user, and displays the faces of its characters on the display screen of the general purpose computer 1 at different sizes depending on the progression of the game. In order to aid recognition of the characters within the game, the facial features thereof may be caricatured using the techniques provided by the present invention, as follows.

Imagine the game program 32 is being executed by the computer 1. The visual display provided by the game program 32 requires the facial features of a character to be displayed on the screen at a certain size. The game program 32 stores a texture image of the characters face as a facial image. As part of its internal processing, the game program 32 determines the size of the facial image of the character to be displayed. Then, prior to display the game program 32 interfaces with the control and interface program 36, and passes the information relating to the intended image size, as well as the actual facial image of the character to be displayed to the control and interface program 36. The control and interface program 36 then uses this received information to determine the caricature level in the same manner as previously described in respect of the first embodiment, and then starts the caricaturing program 34, passing the input data to the caricaturing program as previously described in the first embodiment. The caricaturing program 34 then produces a caricatured image using the received information, which is passed back to the control and interface program 36. The control and interface program 36 then passes back the generated caricature image to the game program 32, which uses the generated caricature image as a texture map for the face of the character when the display generated by the game program is being rendered for display on the screen of the general purpose computer 1. The result is that the face of the character as displayed on the screen is textured with the generated caricatured image hence resulting in increased recognisability to a user of the game program 32.

Relating the above described second embodiment to the detailed description of the first embodiment as given previously, it will be seen that the operation of the second embodiment is almost identical to the operation of the first embodiment, except at the step 4.2 the control and interface program receives the input image from the game program 32, and similarly, at step 4.4 the control and interface program 36 receives information determining the intended caricature image size from the game program 32. The remaining steps of the process of the second embodiment are then identical to those previously described in respect of the first embodiment, up until the image is generated. Once the caricature image is generated within the second embodiment the control and interface program 36 passes the generated image back to the game program 32 for display, rather than displaying the image directly to the user itself. The second embodiment of the invention therefore provides that the size dependent caricaturing techniques provided by the invention may be used by other applications, such as game programs or the like, by interfacing the control and caricaturing programs provided by the embodiment with those other applications.

Moreover, whilst in the second embodiment we have described the caricaturing program 34 and the control and interface program 36 as being separate from the game program 32, this need not necessarily be the case, and the caricaturing program 34 and control and interface program 36 may be fully incorporated within the game program 32 as modules thereof.

Turning now to other modifications which may be made to either of the embodiments, with respect to the function which sets the caricature level in dependence on the image size, the inventors have found that a generally inverse function over at least a sub range of the possible image sizes as is shown in FIG. 5 is preferable, but the invention is not limited to the use of such a function, and instead a function where the caricature level increases with image size may also be used. Moreover, the functions may be linear functions, non-linear functions, and also may be applied over the whole range of possible intended image sizes rather than merely a sub range as shown in FIG. 5.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

What is claimed is:

1. A computer implemented method of generating a caricatured image said method comprising: using at least one computer with accessible input/output to perform the following steps:
    determining a caricature level value in dependence on an intended size of the caricatured image to be generated; and
    generating the caricatured image of said intended size using the caricature level value thus determined;
    wherein the determining step further comprises determining the caricature level value as a generally inverse function of the intended size of the caricatured image to be generated.

2. A computer implemented method according to claim 1, wherein:
    the function is applied over at least a sub-range of the possible range of intended sizes of the caricatured image to be generated.

3. A computer readable medium storing a computer program or suite of computer programs arranged such that when executed by a computer system said computer programs enable the computer system to operate according to claim 1.

4. A computer system for generating caricatured images, the computer system comprising input/output and storage means and processing means, said processing means being arranged in use to:
    i) receive inputs from the input means and determine a caricature level value in dependence on an intended size of the caricatured image to be generated; and
    ii) generate the caricatured image of said intended size using the caricature level value thus determined;
    wherein the processing means is further arranged in use to determine the caricature level value as a generally inverse function of the intended size of the caricatured image to be generated, and to store the caricature level value using the storage means and/or output the caricature level value using the output means.

5. A computer system according to claim 4, wherein:
    the function is applied over at least a sub-range of the possible range of intended sizes of the caricatured image to be generated.

* * * * *